NONRECIPROCAL WAVE TRANSLATING NETWORK

Filed Oct. 30, 1959

INVENTOR
J. M. SIPRESS
BY Sylvan Sherman
ATTORNEY

NONRECIPROCAL WAVE TRANSLATING NETWORK

Filed Oct. 30, 1959

6 Sheets-Sheet 2

INVENTOR
J. M. SIPRESS
BY Sylvan Sherman
ATTORNEY

INVENTOR
J. M. SIPRESS
BY
Sylvan Sherman
ATTORNEY

INVENTOR
J. M. SIPRESS
BY Sylvan Sherman
ATTORNEY

July 23, 1963 J. M. SIPRESS 3,098,978

NONRECIPROCAL WAVE TRANSLATING NETWORK

Filed Oct. 30, 1959 6 Sheets-Sheet 5

INVENTOR
J. M. SIPRESS
BY Sylvan Sherman
ATTORNEY

July 23, 1963 J. M. SIPRESS 3,098,978

NONRECIPROCAL WAVE TRANSLATING NETWORK

Filed Oct. 30, 1959 6 Sheets-Sheet 6

INVENTOR
J. M. SIPRESS
BY
Sylvan Sherman
ATTORNEY

United States Patent Office 3,098,978

Patented July 23, 1963

3,098,978

NONRECIPROCAL WAVE TRANSLATING NETWORK

Jack M. Sipress, Summit, N.J., assignor to Bell Telephone Laboratories, Incorporated, New York, N.Y., a corporation of New York Filed Oct. 30, 1959, Ser. No. 849,844

7 Claims. (Cl. 330—12)

This invention relates to nonreciprocal signal translating networks and in particular to gyrators.

A gyrator may be defined as a four-terminal element in which the following relationships exist: (see FIG. 1)

$$E_1 = Z_1 I_2$$

$$E_2 = -Z_2 I_1$$

Since the coefficients of the current terms are of opposite sign and in general are unequal, the gyrator violates the principle of reciprocity. This is in marked contrast to networks composed of the usual electrical elements such as resistors, capacitors, inductors and transformers, in that such elements, individually, and in combination, satisfy the reciprocity theorem.

In simple terms, the reciprocity theorem states that if a current source is inserted at one point in a network, and if the voltage produced thereby at some other part of the network is measured, the ratio of the measured voltage to the applied current, called the transfer impedance, will be the same if the relative positions of the driving source and the measured effect are reversed.

In the gyrator, however, the transfer impedance for one direction of propagation differs in sign from that for propagation in the reverse direction. In addition, the magnitudes of the transfer impedances for the two directions of propagation are, in general, unequal.

One very important application of the gyrator is as an impedance inverter, that is, if an impedance Z is connected between one pair of terminals of the gyrator, the impedance measured at the other pair of terminals is proportional to $1/Z$. Thus, a capacitor of capacitance C may be made to appear as an inductor whose inductance is proportional to C.

Network synthesis, in the past, has been based upon the existence of four basic circuit elements, the capacitor, the resistor, the inductor and the ideal transformer. It is apparent that the introduction of a fifth circuit element, such as a gyrator, leads to considerably improved solutions for many network problems.

Gyrators have been realized, in the past, by means of mechanically coupled piezoelectric and electromagnetic translators, by means of electromagnetic coupling through Hall effect materials, and most recently, by means of electromagnetic coupling to gyromagnetic materials at microwave frequencies.

It is an object of this invention to produce gyrator action at frequencies at which lumped parameter circuit components are used.

It is a further object of this invention that such gyrator networks be broadband, stable and simple in construction and operation.

In the copending application filed jointly on behalf of applicant and F. J. Witt (Case 1—1), Serial No. 849,843, filed October 30, 1959, there is disclosed a class of gyrator circuits which are derived from one form of the open circuit impedance matrix representation of the ideal gyrator. Gyrator action in accordance with the present invention, however, is produced by means of a circuit configuration which is based upon an alternative model of the open circuit impedance matrix. In accordance with the invention, gyrator action is produced by means of a combination of active and passive circuit components. In particular the circuit comprises a four-terminal network having a pair of input and a pair of output terminals. An impedance and a current source are connected in parallel between one of the input terminals and one of the output terminals and a voltage source is connected across the output terminals. Gyrator effects are produced when the output of the voltage source is proportional to the input current and the output of the current source is proportional to the output current.

Although the gyrator network described above may be realized using vacuum tubes, transistors or other similar active elements, two transistorized embodiments of the invention are shown.

The designations "input" and "output" as used herein in referring to the network terminals are understood to be relative terms used solely for the purposes of explanation since the gyrator may be driven at either pair of terminals and output means connected across the remaining pair of terminals.

It is a feature of the present invention that the circuit, while using fewer active elements may, nevertheless, be made to more nearly approximate the ideal gyrator than the circuits in the above-mentioned copending application.

It is a further feature of the present invention that gyrator action is achieved through the use of a special circuit configuration rather than as a result of the particular adjustment of one or more parameters of the circuit. In many of the prior art networks, the operation of the circuit as a gyrator is directly a function of specially adjusted parameters, and as a result the circuit is quite sensitive to variations in environment and aging of the particular elements of which the given parameters are descriptive.

The performance of a gyrator in accordance with the invention, on the other hand, is substantially independent of variations in the parameters of the active circuit elements. Consequently, the accuracy of the gyrator action is relatively insensitive to changes in the active circuit components, or variations in environment such as temperature, line voltage, et cetera.

These and other objects and advantages, the nature of the present invention, and its various features, will appear more fully upon consideration of the various illustrative embodiments now to be described in detail in connection with the accompanying drawings, in which.

Figure 1:
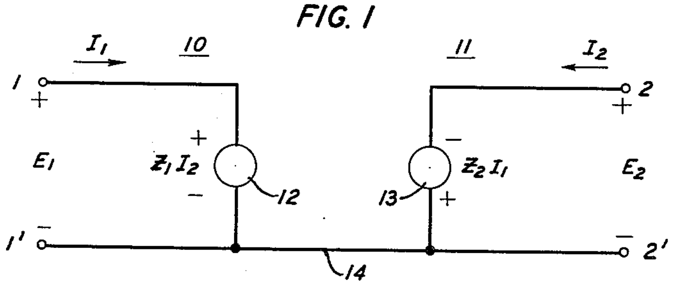
FIG. 1 is an equivalent circuit of a gyrator.

Referring more specifically to FIG. 1, there is shown an equivalent circuit diagram of an ideal gyrator of the type implemented in the above-mentioned copending application. The circuit comprises the two meshes 10 and 11, each of which has zero open circuit self-impedance. Coupling between the two meshes is provided by means of the mutual impedances $Z_1$ and $-Z_2$. Specifically, the coupling is in the form of an induced voltage in each of the meshes which is proportional to the current in the other of the meshes. The induced voltages $Z_1I_2$ and $-Z_2I_1$ are represented by the voltage generators 12 and 13, respectively. The terminal 1' of mesh 10 and terminal 2' of mesh 11 are connected together by means of a lead 14 to form a common junction, or reference point.

To more fully and readily understand the gyrator circuit in accordance with the invention, the equivalent circuit of FIG. 1 is modified in the manner to be described hereinafter.

Figure 2:
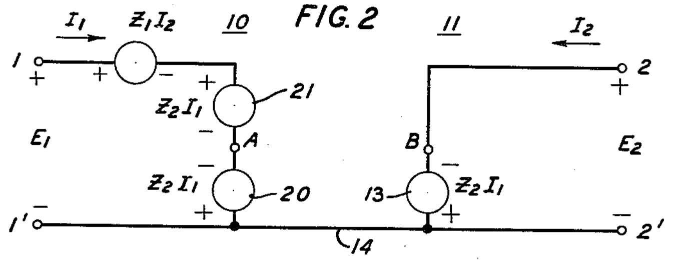
FIGS. 2 and 3 show by way of illustration successive steps in the derivation of a modified equivalent circuit.

In FIG. 2 there is shown the basic circuit of FIG. 1 to which there has been added the voltage generators 20 and 21 whose amplitude, $Z_2I_1$, is equal to that of generator 13. These generators are serially connected in mesh 10, but poled 180 degrees out of phase so as to produce no net change at the terminals of the circuit.

Figure 3:
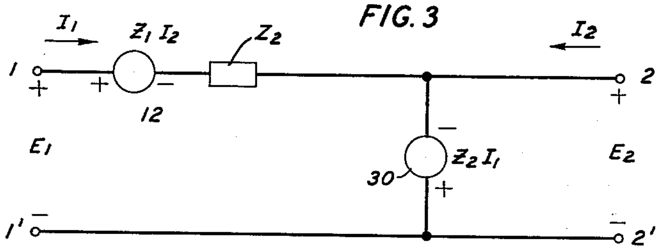

It will be noted that with the positive terminal of generator 20 connected to the common reference point 14, point A in mesh 10 and point B in mesh 11 are at the same potential and may be conductively connected together, placing generators 13 and 20 in parallel. Since they are both ideal voltage sources, and are connected in parallel, they are equivalent to, and may be replaced by, a single voltage source of the same potential. This substitution is shown in FIG. 3 wherein generator 30 of value $Z_2I_1$ replaces the two parallel connected generators 13 and 20. The circuit may be further simplified by replacing the voltage source 21 by the simple impedance $Z_2$, which, with current $I_1$ flowing through it, produces the voltage drop $Z_2I_1$ as before. This change is also shown in FIG. 3.

Figure 4:
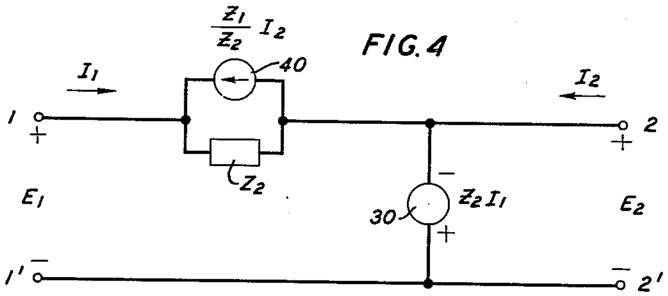
FIG. 4 is a modified equivalent circuit of a gyrator.

If now the series combination of voltage generator 12 and impedance $Z_2$ are replaced by a parallel connected current generator of amplitude $$\frac{Z_1}{Z_2}I_2$$

and impedance $Z_2$ as derived by means of a Thevenin to Norton conversion, the modified circuit of FIG. 4 is obtained.

That the circuit of FIG. 4 performs as a gyrator may be demonstrated by first applying a current $I_1$ to terminal 1 and measuring the open circuit voltage across terminals 2—2'. With terminals 2—2' open-circuited, $I_2$ is zero and $E_2$ is equal to $-Z_2I_1$. The transfer impedance from terminals 1—1' to terminals 2—2' is therefore $$E_2/I_1=-Z_2$$

A current $I_2$ is then applied to terminal 2 and the open circuit voltage across terminals 1—1' measured. With terminals 1—1' open-circuited, $I_1$ is zero so that generator 30 is not activated. However, generator 30 has zero self-impedance and acts as a short circuit between terminals 2—2' effectively shorting terminal 2 to the common terminals 1' and 2'. With current $I_2$ applied to terminal 2, current amplifier 40 is activated, producing a current $$\frac{Z_1}{Z_2}I_2$$

which flows through impedance $Z_2$ to produce the voltage drop $Z_1I_2$ between terminals 1 and 2. Since terminal 2 is shorted to terminal 1' through generator 30, voltage $Z_1I_2$ also appears across terminals 1—1'. Thus, voltage $E_1$ equals $Z_1I_2$ and the transfer impedance in the reverse direction is $E_1/I_2=Z_1$.

In addition to producing gyrator effects, this circuit has zero open circuit self-impedances at each pair of terminals. For example, with terminals 1—1' open-circuited, generator 30 is not actuated, and appears as a short circuit across terminals 2—2'. Similarly, with terminals 2—2' open-circuited a current $I_1$ applied to terminal 1 causes a voltage drop $Z_2I_1$ between terminals 1 and 2. However, this same voltage appears at generator 30 with the polarity as shown in FIG. 4. Hence, the voltage $E_1$ is $$E_1=I_1Z_2-I_1Z_2=0$$

In accordance with the circuit of FIG. 4, it is seen that gyrator action is produced by connecting a current responsive current generator 40 in parallel with an impedance $Z_2$ between terminals 1 and 2, and by connecting a current responsive voltage generator 30 between terminals 2—2'. Specifically, the amplitude of the voltage produced by voltage generator 30 is proportional to the current at terminal 1, whereas the current produced by current generator 40 is proportional to the current at terminal 2. The voltage polarity and current directions are as indicated in FIG. 4.

To realize an ideal gyrator, in accordance with the invention, two idealized circuit components are postulated. These are a voltage amplifier and a current amplifier.

Figure 5A:
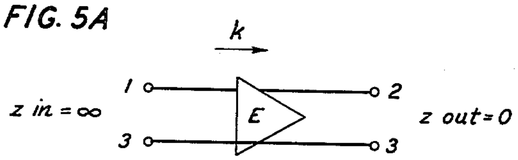
FIGS. 5A and 5B show by way of illustration an ideal voltage amplifier and a transistor equivalent circuit.

The ideal voltage amplifier, as contemplated by the invention, is shown symbolically in FIG. 5A. It has infinite input impedance, zero output impedance, a finite positive voltage gain $k$ in the forward direction, and zero current gain in the reverse direction. The ideal current amplifier, shown symbolically in FIG. 6A, has zero input impedance, infinite output impedance, a finite positive current gain K in the forward direction, and zero voltage gain in the reverse direction.

Both of these circuit components may be approximated, in general, by using any of the well known active circuit elements or combinations thereof. Because of the many advantages enjoyed by transistors, however, the embodiment of the present invention will be illustrated using transistors as the active circuit elements.

The transistor may be regarded as a device whose collector and emitter currents are substantially equal, whose base current is zero (negligible with respect to the emitter or collector current), and whose emitter-to-base voltage is also negligibly small. To the extent that the transistor characteristics depart from these assumptions, the resulting amplifier circuits will depart from the postulated ideal.

Figure 5B:
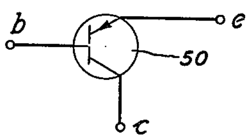

Based upon the above-enumerated characteristics of the transistor, the voltage amplifier of FIG. 5A can be realized by the common collector connection of the transistor shown in FIG. 5B. This equivalence is obtained by connecting the input between the base $b$ and the collector $c$ of transistor 50, and taking the output between the emitter $e$ and the collector $c$.

Figure 6A:
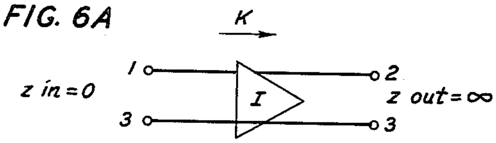
FIGS. 6A and 6B show by way of illustration an ideal current amplifier and a transistor equivalent circuit.
Figure 6B:
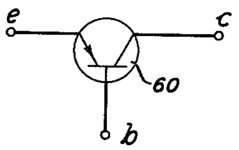

The current amplifier of FIG. 6A can be realized, as indicated in FIG. 6B, by means of the common base transistor connection. In this configuration, the input is applied between the emitter $e$ and base $b$ of transistor 60, and the output is taken between the collector $c$ and base $b$.

It should be noted, however, that the voltage gain $k$ of the transistor voltage amplifier of FIG. 5B and the current gain K of the transistor current amplifier of FIG. 6B are both equal to unity.

Figure 7A:
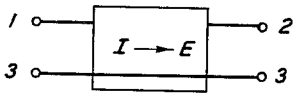
FIGS. 7A and 7B show by way of illustration a current-to-voltage transducer and a network equivalent.
Figure 7B:
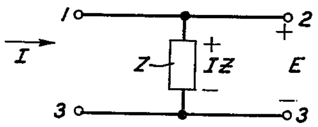

One additional circuit element should be briefly considered. It is the current-to-voltage transducer shown symbolically in FIG. 7A. The transducer has a finite open circuit input and output impedance, and can be readily realizable by means of a simple shunt impedance Z, as shown in FIG. 7B. A current I applied to one of the ports produces an open circuit voltage E equal to IZ at the other port, as indicated in FIG. 7B.

The gyrator may now be constructed using the above-described circuit components. This is most conveniently done by considering the two aforementioned portions of the circuit separately, at first, and then interconnecting them in appropriate fashion.

Figure 8:
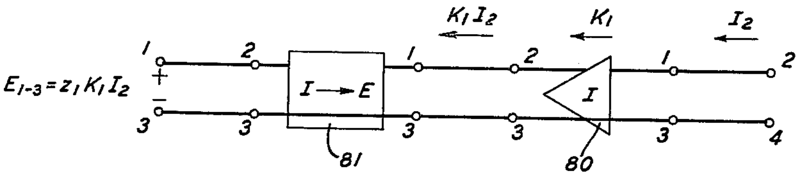
FIGS. 8 and 9 show, in block diagram, portions of the gyrator circuit in accordance with the invention.

The first portion of the circuit comprises the current source proportional to $I_2$ and an impedance connected in parallel between network terminals 1 and 2, as shown in FIG. 4. This portion of the gyrator may be realized as shown in FIG. 8, by means of the current amplifier 80 having a forward current gain $K_1$ and a current-to-voltage transducer 81 having an open circuit transfer impedance of value $z_1$. A current $I_2$ impressed upon input terminal 1 of current amplifier 80 produces an output current $K_1I_2$, which, when applied to transducer 81, is converted into a voltage $z_1K_1I_2$ across network terminals 1—3. That is, $$E_{1-3}=z_1K_1I_2$$

or $$E_{1-3}/I_2=Z_1$$

where $$z_1K_1=Z_1$$

Figure 9:
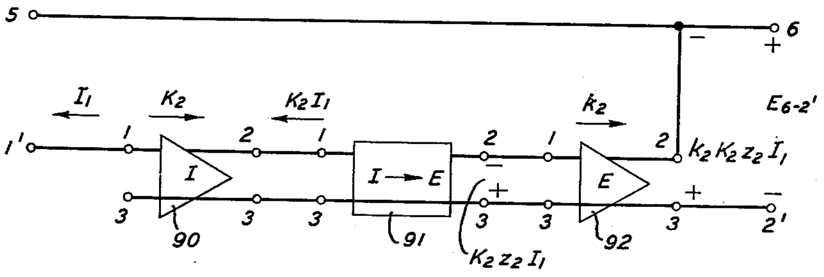

The second portion of the network comprises the current controlled voltage source 30 of FIG. 4 connected between terminals 2—2', which, in response to a current $I_1$ applied at terminal 1, produces an open circuit voltage across terminals 2—2', which is proportional to $I_1$ and of a polarity as shown in FIG. 4. A circuit to accomplish this is shown in FIG. 9 and comprises, in cascade, the current amplifier 90 having a forward current gain $K_2$, the current-to-voltage transducer 91 having an open circuit transfer impedance $z_2$, and the voltage amplifier 92 of gain $k_2$. The network input terminals 5 and 1' are connected to the output terminal 2 of voltage amplifier 92 and the input terminal 1 of current amplifier 90, respectively. Network output terminals 6 and 2' are, in turn, connected to the output terminals 2 and 3 of voltage amplifier 92.

The explanation of the operation of the circuit of FIG. 9 is most easily made and understood by considering the current $I_1$ impressed upon terminal 1' in the direction shown. In response to this current, there is produced in the output of amplifier 90 a current $K_2I_1$. Current $K_2I_1$ is converted by transducer 91 to a voltage $K_1z_2I_1$. This voltage is, in turn, impressed upon voltage amplifier 92. The output of amplifier 92 is the voltage $E_{6-2}$ which is equal to $-k_2K_2z_2I_1$. The transfer impedance is then given as $$E_2/I_1=-k_2K_2z_2$$

or, since $$E_2/I_1=-Z_2$$

then $$k_2K_2z_2=Z_2$$

Figure 10:
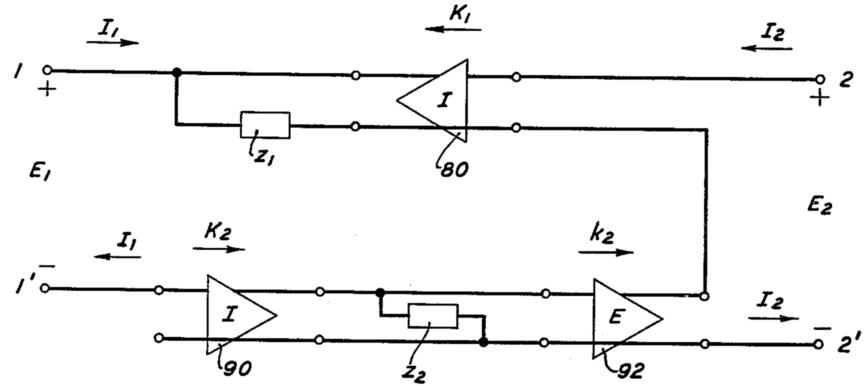
FIG. 10 shows in block diagram the complete gyrator circuit in accordance with the invention.

The complete gyrator network is obtained by connecting the two individual circuit portions of FIG. 8 and FIG. 9 in series by connecting network terminal 3 of FIG. 8 to network terminal 5 of FIG. 9 and network terminal 4 of FIG. 8 to network terminal 6 of FIG. 9. The combined circuit is shown in FIG. 10 wherein the numerical designation of FIGS. 8 and 9 have been retained to facilitate the identification of the various components. In addition, the current-to-voltage transducer 81 has been replaced by its single impedance implementation ($z_1$) and the current-to-voltage transducer 91 has been replaced by its single impedance implementation, the shunt impedance $z_2$, as per FIG. 7B. Input and output circuit means, not shown, are connected across terminals 1—1' and 2—2', respectively.

It will be noted that while terminals 1' and 2' are directly connected together in the model circuit of FIG. 4, they are not so connected in the embodiment of FIG. 10. They are nevertheless at the same potential insofar as the signal is concerned since the voltage across the input terminals of the ideal current amplifier 90 is always zero.

As has been stated above, it is a property of an ideal gyrator that both its open circuit self-impedances are zero. An examination of FIG. 10, however, discloses that the gyrator there shown does not necessarily satisfy this condition, for while the open circuit self-impedance at terminals 2—2' is zero (the input impedance of amplifier 80 and the output impedance of amplifier 92 being zero), this is not always the case at terminals 1—1'. Specifically, if terminals 2—2' are open-circuited anl a current $I_1$ is applied to terminal 1, a voltage $E_1$ may be developed between terminals 1—1'. The circuit will be examined to determine what conditions must be satisfied for voltage $E_1$ to reduce to zero.

Figure 11:
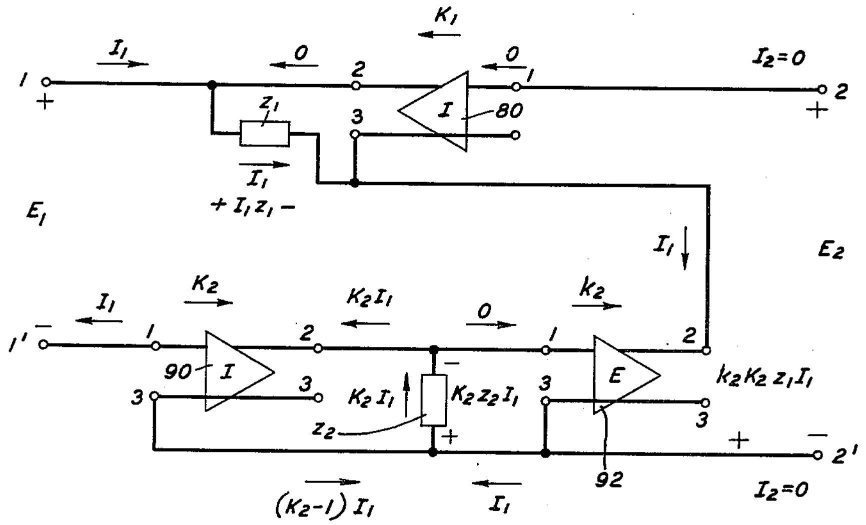
FIG. 11 shows the current and voltage distribution throughout the gyrator circuit of FIG. 10 with terminals 2—2′ open-circuited.

In FIG. 11 the network of FIG. 10 has been reproduced and the various currents and voltages that are produced throughout the network in response to a current $I_1$ applied to terminal 1 are shown.

With terminals 2—2' open-circuited, $I_2$ is zero. Hence, the currents into and out of current amplifier 80 are zero and all of current $I_1$ flows through impedance $z_1$ to terminal 2 of voltage amplifier 92. Since it has been postulated that the reverse current transmission and the input admittance of the ideal voltage amplifier are both zero, all of current $I_1$ flows from terminal 2 to terminal 3 of amplifier 92, and the current into terminal 1 of amplifier 92 is zero. Applying Kirchhoff's current law to the network of FIG. 11 (see Introductory Circuit Theory by E. A. Guillemin, page 68), the current leaving network terminal 1' must be equal to $I_1$. The current into terminal 2 of amplifier 90 is therefore $K_2I_1$ and the current leaving terminal 3 of amplifier 90 must be $(K_2-1)I_1$. Considering either node to which impedance $z_2$ is connected, the current through $z_2$ is equal to $K_2I_1$. The total voltage $E_1$ is then equal to the sum of the voltage drops across impedance $z_1$, between terminals 2—3 of voltage amplifier 92, and between terminals 3 and 1 of current amplifier 90. The first of these voltages is simply $I_1z_1$. The voltage across terminals 2—3 of amplifier 92, in response to the voltage drop produced by current $K_2I_1$ flowing through impedance $z_2$ is $-k_2K_2z_2I_1$. The voltage drop between terminals 3 and 1 of current amplifier 90 is zero, since the voltage gain of amplifier 90 in the reverse direction is zero and the input impedance to the amplifier is zero. Hence, $$E_1=I_1z_1-k_2K_2z_2I_1+0$$

For $E_1$ to be zero, $$I_1z_1=k_2K_2z_2I_1$$

or $$z_1=k_2K_2z_2 \quad (1)$$

where $K_2$ is the current gain of current amplifier 90 and $k_2$ is the voltage gain of voltage amplifier 92.

Because the condition to be satisfied is a function of the parameters of the two amplifiers, and may therefore vary with time and environment, either $z_1$ or $z_2$ is made adjustable in those situations where zero open circuit self-impedance is a desirable or necessary operating condition.

Figure 12:
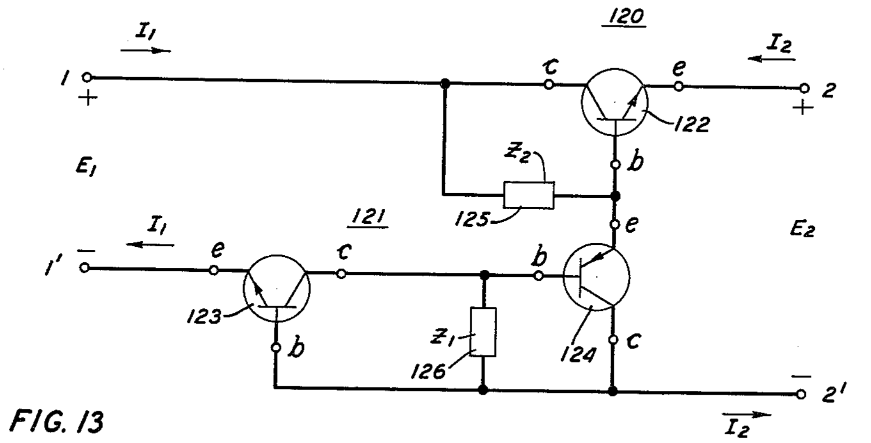
FIG. 12 is a transistorized embodiment of the gyrator circuit of FIG. 10.

In FIG. 12, a transistorized embodiment of the gyrator of FIG. 11 is shown. It comprises the two suitably connected signal paths 120 and 121. Path 120 comprises transistor 122 which, connected in the common base configuration of FIG. 6B corresponds to current amplifier 80 of FIG. 11, and the impedance 125 connected between the collector *c* and base *b* of transistor 122.

Signal path 121 comprises transistor 123 which, connected in the common base configuration of FIG. 6B, corresponds the current amplifier 90 of FIG. 11; shunt impedance 126 which corresponds to the current-to-voltage transducer 91 of FIG. 9 (impedance $z_2$ of FIG. 11), and transistor 124, connected in the common collector configuration of FIG. 5B corresponding to voltage amplifier 92 of FIG. 11. To simplify the circuit diagram, none of the biasing circuit components are shown in FIG. 12.

While the circuits of FIGS. 11 and 12 satisfy the gyrator requirements set out by the equivalent circuit of FIG. 4, it has the practical disadvantage that there is no common terminal or reference point. That is, terminals 1' and 2' are not conductively connected together. This situation can be remedied by replacing the portion of the block diagram circuit of FIG. 13 enclosed by the box A by the circuit of FIG. 14.

Figure 13:
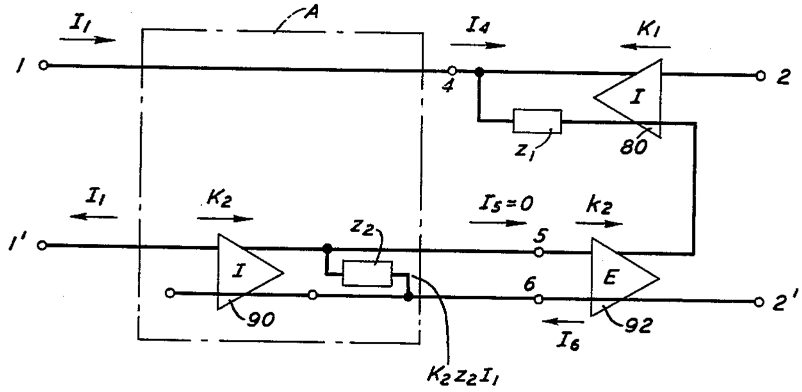
FIG. 13 shows, in block diagram, the gyrator circuit of FIG. 10 with a portion thereof blocked off.
Figure 14:
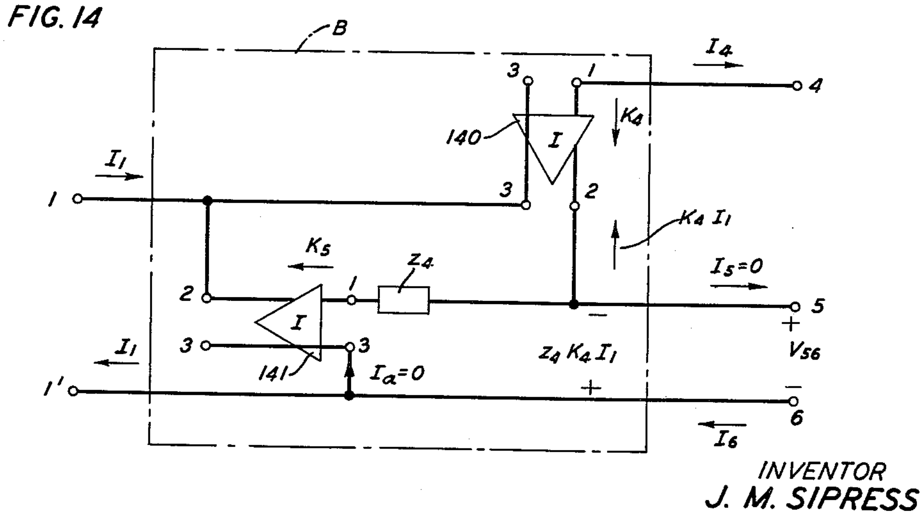
FIG. 14 shows a network to replace the blocked off portion of FIG. 13.

Upon examining the network of FIG. 13 and that portion thereof enclosed in box A, certain requirements or conditions which must be met by network B of FIG. 14 become evident. These include the following:

(1) The current entering terminal 1 must equal the current leaving at terminal 1'.

(2) The current at terminal 5 is always zero since the input impedance to the ideal voltage amplifier 92 is infinite.

(3) The current entering at terminal 1 must equal the current leaving at terminal 4.

(4) Because of condition 2, the current entering network B at terminal 6 is equal to the current leaving at terminal 1'.

(5) The voltage between terminals 5 and 6 is equal to $-z_2K_2I_1$ where $I_1$ is the current at terminal 1. That is, $$V_{56}=-z_2K_2I_1 \qquad (2)$$

With reference to FIG. 14, since the current leaving terminal 1' is equal to the current entering terminal 6, then the current at terminal 3 of current amplifier 141, $I_a$, must be zero, or the forward current gain $K_5$ of amplifier 141 must be unity. That is, $$K_5=1 \qquad (3)$$

Also, since $I_1=I_4$ and $I_5=0$, the current through $z_4$ must be equal to $K_4I_1$ where $K_4$ is the current gain of amplifier 140, or the voltage drop across $z_4$ must be $z_4K_4I_1$. Since the input impedance and the reverse voltage gain of current amplifier 141 are zero, the voltage $V_{56}$ is equal to the voltage across $z_4$. That is, $$V_{56}=-z_4K_4I_1 \qquad (4)$$

Hence, from Equation 2, $$z_2K_2=z_4K_4 \qquad (5)$$

Figure 15:
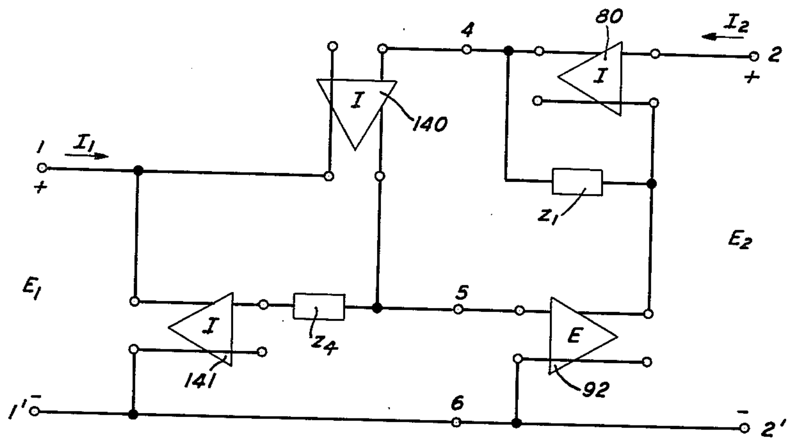
FIG. 15 shows in block diagram a second embodiment of the gyrator circuit in accordance with the invention.

It will now be shown that if the conditions of Equations 3 and 5 are satisfied, the circuit of FIG. 14 may be substituted for that portion of the circuit of FIG. 13 enclosed by box A in the manner shown in FIG. 15.

The circuit of FIG. 15 comprises current amplifier 80, impedance $z_1$ and voltage amplifier 92 as before, to which there is added the current amplifier 140, having a current gain $K_4$, impedance $z_4$, and current amplifier 141 having a current gain $K_5$ equal to unity. The retained portion of the former circuit (FIG. 11) and the new portion are joined at terminals 4, 5 and 6. It will be noted that there is now a common connection between terminals 1' and 2'.

Figure 16:
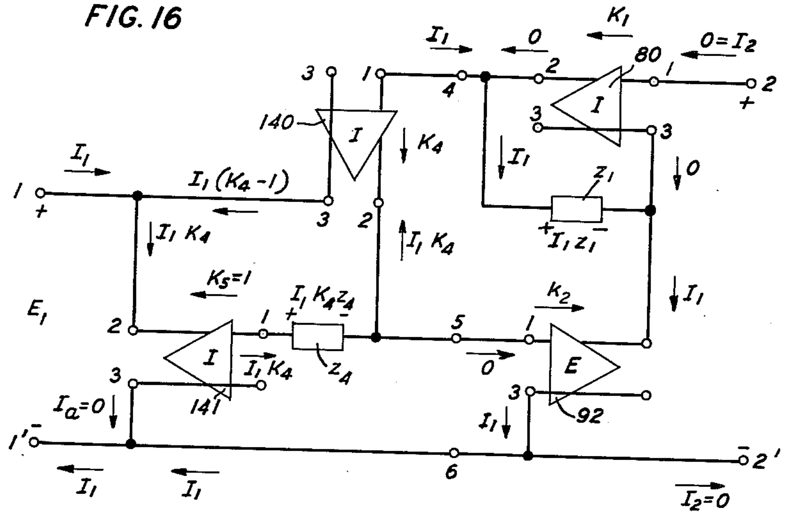
FIGS. 16 and 17 show the gyrator circuit of FIG. 15 with the current and voltage distribution throughout the network under different conditions of operation.

That the circuit of FIG. 15 operates as a gyrator may now be shown by computing the open circuit transfer and self-impedances at each of the ports. With terminals 2—2' open-circuited, and a current $I_1$ applied to terminal 1, the currents and voltages throughout the network are shown in FIG. 16 and can be readily ascertained as follows.

The total current $I_1$ applied to terminal 1 must leave the network by way of terminal 1'. Since it was specified that the gain of current amplifier 141 should be unity, current $I_a$ leaving terminal 3 of amplifier 141 is zero, so that the current at junction 6 is also equal to $I_1$. Noting that the current into terminal 1 of voltage amplifier 92 is zero (amplifier 92 having infinite input impedance and zero reverse gain) and that $I_2$ is zero, current $I_1$ must therefore enter amplifier 92 at its output terminal 2 and leave by way of terminal 3, as shown. With network terminals 2—2' open-circuited, $I_2$ is zero, so that the current in and out of current amplifier 80 is zero, and all of current $I_1$ flows through impedance $z_1$ producing a voltage drop $I_1z_1$. Current $I_1$, impressed upon input terminal 1 of current amplifier 140, produces a currrent $I_1K_4$ at the output of amplifier 140, and since the current at junction 5 is zero, current $I_1K_4$ must flow through impedance $z_4$ to produce a voltage drop $I_1K_4z_4$. Current $I_1K_4$ also activates amplifier 141, and since the gain of amplifier 141 is unity, the output current produced thereby is also $I_4K_4$. The current leaving terminal 3 of amplifier 140 is $I_1(K_4-1)$, the difference between its input current and its output current. The sum of this current and the output current of amplifier 141 at their junction point is equal to $I_1$, the input current, as required.

Having thus determined the current and voltage distribution throughout the network, the open circuit output voltage at terminals 2—2', the sum of the voltages between the input terminals 1—3 of current amplifier 80, and the output terminals 2—3 of voltage amplifier 92, are readily determined. Since both the input impedance and the reverse voltage gain of current amplifier 80 are zero, the voltage across its terminals 1—3 is zero. For the same reasons the voltage across impedance $z_4$ is effectively across the input of voltage amplifier 92. The output voltage of this amplifier is equal to its input voltage multiplied by its gain $k_2$, and hence, $$E_2=-I_1z_4K_4k_2 \qquad (6)$$

where $K_4$ is the current gain of current amplifier 140 and $k_2$ is the voltage gain of voltage amplifier 92.

The self-impedance between terminals 1—1' may be ascertained by writing Kirchhoff's voltage equation for the loop including the input terminals 1—3 of amplifier 140, impedance $z_1$, and the output terminals 2—3 of amplifier 92. This gives $$E_{1-1'}=0+I_1z_1-I_1z_4K_4k_2$$

For the self-impedance at terminals 1—1' to be zero, $E_{1-1'}$ must be zero, or $$z_1=z_4K_4k_2 \qquad (7)$$

From Equation 1 above $$z_1=K_2k_2z_2$$

so that $$z_4K_4=z_2K_2$$

which is precisely the condition specified by Equation 5.

Figure 17:
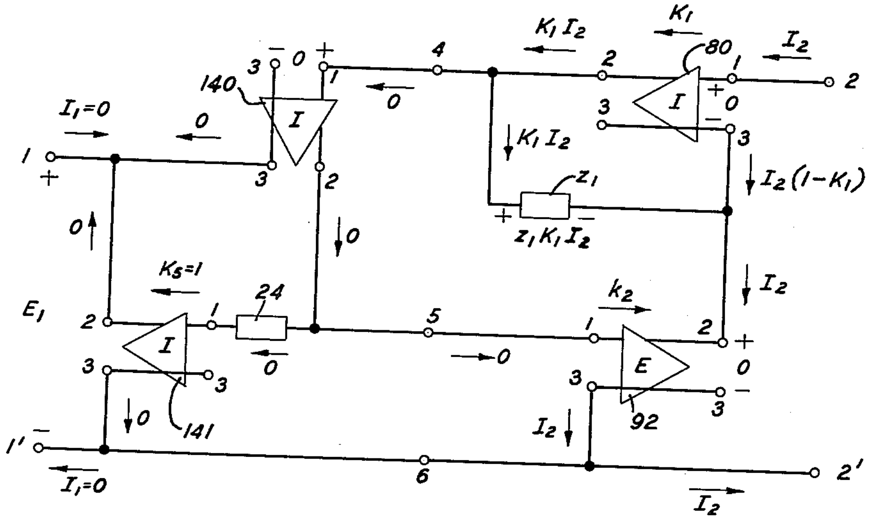

Proceeding to further analyze the operation of the circuit of FIG. 15, a current $I_2$ is now applied at terminal 2 with terminals 1—1' open-circuited. FIG. 17 shows the voltage and current distribution throughout the network under these conditions. First considering the portion of the network bounded by terminals 1—4—5 and terminal 3 of current amplifier 141, it is evident that since the current past terminals 1, 5 and 3 are zero, the current into terminal 4 is zero. This, in turn, requires that the current through the impedance $z_4$, the current past terminal 6 and the output voltage of amplifier 92 will be zero. Now, a current $I_2$ applied to network terminal 2 activates amplifier 80, which, in response thereto, produces an output current $K_1I_2$. Since the current at terminal 4 is zero, all of the current $K_1I_2$ flows through impedance $z_1$ causing a voltage drop of amplitude $z_1K_1I_2$. The current out of terminal 3 of current amplifier 80 when added to current $K_1I_2$ equals $I_2$, which current then flows into terminal 2 of voltage amplifier 92. Since the currents past terminals 5 and 6 are zero, a current equal to $I_2$ must flow out of terminal 3 of amplifier 92 to network terminal 2' as required.

The voltage $E_1$ is the sum of the voltage drops in the loop comprising the input to current amplifier 140, the impedance $z_1$, and the output of voltage amplifier 92.

Since the voltage across the input to amplifier 140 and the output of amplifier 92 is zero, $$E_1=z_1K_1I_2$$

or since $$E_1/I_2=Z_1$$

therefore $$Z_1=z_1K_1$$

The self-impedance across terminals 2—2' is proportional to the voltage between these terminals. Since the voltages between terminals 1—3 of amplifier 80 and between 2 and 3 of amplifier 92 are both zero, $E_2$ is zero and the self-impedance between terminals 2—2' is zero.

Figure 18:
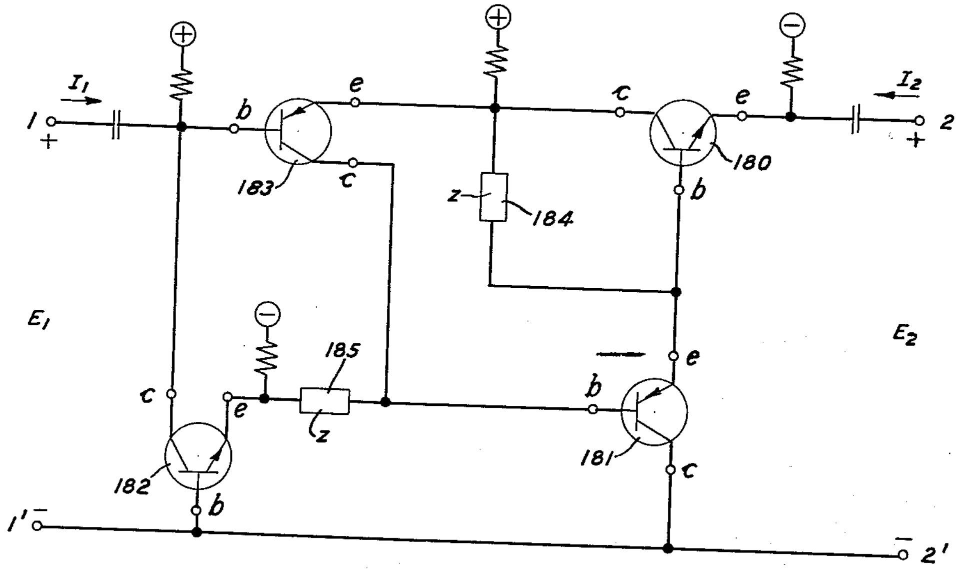
FIG. 18 is a transistorized embodiment of the gyrator circuit of FIG. 15.

In FIG. 18 there is shown a transistorized embodiment of the gyrator of FIG. 15. The circuit comprises transistor 180, connected in the common base configuration having an impedance 184 connected between collector *c* and base *b*. Transistor 180 and impedance 184 correspond to amplifier 80 and impedance $z_1$ of FIG. 15. Transistor 181, connected in the common collector configuration, corresponds to voltage amplifier 92. Transistor 182 functions as current amplifier 141 and transistor 183 functions as current amplifier 140. Connected between the emitter *e* of transistor 182 and the base *b* of transistor 181 is a second impedance 185.

Since the current or voltage gain of each of the four transistor amplifiers is unity, impedance 184 and 185 are substantially equal, one or the other being adjustable as explained hereinbefore.

Also shown but not otherwise identified, are the various resistors, capacitors and their direct current power sources for establishing the necessary operating biases in the several transistors.

In the illustrative embodiments of the invention shown in FIGS. 12 and 18, both n-p-n and p-n-p type transistors were used. The intermingling of both types of transistors within one network was merely an expedient for simplifying the biasing arrangements. Obviously, by making the appropriate changes in the biasing circuits, one or the other of the two types of transistors could be used exclusively.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A four terminal network having a pair of input and a pair of output terminals, said network having an input current $I_1$ and an output current $I_2$, a voltage source connected between said output terminals, the parallel combination of a current source and an impedance connected from one of said input terminals to one of said output terminals, the other of said input terminals connected to the other of said output terminals, said voltage source having an output voltage proportional to said input current $I_1$ and said current source having an output current proportional to said output current $I_2$.

2. A nonreciprocal signal translating network comprising two signal paths, the first of said paths comprising, in cascade, a first current amplifier and a first current-to-voltage transducer, the second of said paths comprising a second current amplifier, a second current-to-voltage transducer and a voltage amplifier, said amplifiers and said transducers each having a pair of input terminals and pair of output terminals, one of said output terminals of said voltage amplifier being connected to one of the input terminals of said first current amplifier, means for connecting an output circuit between the other output terminal of said voltage amplifier and the other input terminal of said first current amplifier, one of the output terminals of said first transducer being connected to said one output terminal of said voltage amplifier, and means for connecting an input circuit between the other output terminal of said first transducer and an input terminal of said second current amplifier.

3. A gyrator comprising first, second and third current amplifiers, and a voltage amplifier, each of said amplifiers having an input terminal, an output terminal and a common terminal, the common terminal of said first current amplifier being connected to the output terminal of said voltage amplifier, the output terminal of said first current amplifier being connected to the input terminal of said second current amplifier, the output terminal of said second current amplifier being connected to the input terminal of said voltage amplifier, the output terminal of said third current amplifier being connected to the common junction of said second current amplifier, the common junction of said third current amplifier being connected to the common junction of said voltage amplifier, a first impedance connected between the output terminal of said first current amplifier and the output terminal of said voltage amplifier, a second impedance being connected between the input terminal of said third current amplifier and the input terminal of said voltage amplifier, input means connected between the common junctions of said second and third current amplifiers, and output means connected between the input terminal of said first current amplifier and the common junction of said voltage amplifier.

4. A gyrator comprising, in combination, a plurality of transistors each having an emitter, a collector, and a base electrode, means for connecting the base of a first transistor to the emitter of a second transistor, means for connecting the base of said second transistor to the collector of a third transistor, means for connecting the collector of said second transistor to the base of said third transistor, a first impedance connected between the collector and base of said first transistor, a second impedance connected between the base and collector of said second transistor, means for connecting an input circuit between the collector of said first transistor and the emitter of said third transistor, means for connecting an output circuit between the collector of said second transistor and the emitter of said first transistor, and means for applying bias to said transistors.

5. A gyrator comprising, in combination, a plurality of transistors each having an emitter, a collector, and a base electrode, means for connecting the base of a first transistor to the emitter of a second transistor, means for connecting the collector of said first transistor to the emitter of a third transistor, means for connecting the collector of said third transistor to the base of said second transistor, means for connecting the collector of said second transistor to the base of a fourth transistor, means for connecting the base of said third transistor to the collector of said fourth transistor, a first impedance connected between the collector and the base of said first transistor, a second impedance connected between the emitter of said fourth transistor and the base of said second transistor, means for connecting an input circuit between the base of said third transistor and the base of said fourth transistor, means for connecting an output circuit between the emitter of said first transistor and the collector of said second transistor, and means for applying bias to said transistors.

6. The combination according to claim 5 wherein said first impedance and said second impedance are of equal magnitude.

7. A four terminal network comprising two signal paths, the first of said paths comprising, in cascade, a first current amplifier and a first current-to-voltage transducer, the second of said paths comprising, in cascade, a second current amplifier, a second current-to-voltage transducer, and a voltage amplifier, said amplifiers and said transducers each having a pair of input terminals and a pair of output terminals, the input terminals of said first path being the input terminals of said first current amplifier, the output terminals of said first path being the output terminals of said first transducer, the input terminals of said second path being one input terminal of said second current amplifier and one output terminal of said voltage amplifier, the output terminals of said second path being the output terminals of said voltage amplifier, means for connecting one input terminal of said first path to one output terminal of said second path, means for connecting one output terminal of said first path to said one output terminal of said second path, means for connecting an input circuit between the other output terminal of said first path and one input terminal of said second path and means for connecting an output circuit between the other input terminal of said first path and the other output terminal of said second path.

References Cited in the file of this patent

UNITED STATES PATENTS

| | | |
|---|---|---|
| 2,273,997 | Rubin | Feb. 24, 1942 |
| 2,885,492 | D'Heedene | May 5, 1959 |

OTHER REFERENCES

"The Gyrator as a 3-Terminal Element," by J. Shekel, pages 1014–1016, Proceedings of the I.R.E., August 1953.

"Understanding the Gyrator," by Wallese, page 483, Proceedings of the I.R.E., April 1955.

"On the Physical Realizability of Linear Non-Reciprocal Networks," by Carlin, pages 615–616, Proceedings of the I.R.E., May 1955.